US011300236B2

(12) United States Patent
Liszkai (10) Patent No.: US 11,300,236 B2
(45) Date of Patent: Apr. 12, 2022

(54) COMPACT RAISED FACE FLANGE

(71) Applicant: NuScale Power, LLC, Corvallis, OR (US)

(72) Inventor: Tamas Liszkai, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 234 days.

(21) Appl. No.: 16/221,088

(22) Filed: Dec. 14, 2018

(65) Prior Publication Data

US 2020/0096143 A1    Mar. 26, 2020

Related U.S. Application Data

(60) Provisional application No. 62/736,218, filed on Sep. 25, 2018.

(51) Int. Cl.
*F16L 23/032* (2006.01)
*F16L 23/16* (2006.01)
*G21C 13/028* (2006.01)

(52) U.S. Cl.
CPC .............. *F16L 23/032* (2013.01); *F16L 23/16* (2013.01); *G21C 13/028* (2013.01)

(58) Field of Classification Search
CPC ...... G21C 13/028; F16L 23/16; F16L 23/032; F16L 23/02
USPC .................................. 376/205; 285/412, 368
See application file for complete search history.

(56) References Cited

U.S. PATENT DOCUMENTS

| | | | | |
|---|---|---|---|---|
| 1,045,389 | A * | 11/1912 | Gillmor et al. | F16L 23/032 285/368 |
| 3,127,050 | A * | 3/1964 | McDaniels, Jr. | G21C 13/073 220/277 |
| 3,468,561 | A * | 9/1969 | Vasilievich | F16L 23/032 285/23 |
| 4,240,561 | A * | 12/1980 | Hagstrom | B01J 3/03 220/327 |

(Continued)

FOREIGN PATENT DOCUMENTS

DE    202004008300 U1    7/1988
DE         4340051 A1 *    6/1995  ............... F16J 13/02

(Continued)

OTHER PUBLICATIONS

International Search Report and Written Opinion; for International Application No. PCT/US2018/065791; dated Jul. 8, 2019, pp. 15.

*Primary Examiner* — Jack W Keith
*Assistant Examiner* — Jinney Kil
(74) *Attorney, Agent, or Firm* — Perkins Coie LLP (57) ABSTRACT

In an example, a raised face flange assembly, comprises an upper flange to couple to a lower flange using one or more bolts: wherein the upper flange or the lower flange comprises: a bolting face defining one or more openings for the one or more bolts, respectively; a pair of raised faces including a first raised face and a second raised face to make contact with a mating surface of the other of the upper flange or the lower flange; wherein a distance between an area of the second raised face and a plane corresponding to the bolting face is greater than a distance between an area of the first raised face and the plane to distribute contact force with a mating surface over the area of the second raised face to maintain a seal.

20 Claims, 8 Drawing Sheets

(56) References Cited

U.S. PATENT DOCUMENTS

| | | | | |
|---|---|---|---|---|
| 4,584,163 A | * | 4/1986 | Hankinson | F16J 15/002 |
| | | | | 376/205 |
| 4,616,860 A | * | 10/1986 | Faria | F16J 15/0881 |
| | | | | 277/614 |
| 4,685,193 A | * | 8/1987 | Faria | F16J 15/0881 |
| | | | | 29/428 |
| 5,110,536 A | * | 5/1992 | Chevereau | G21C 13/02 |
| | | | | 376/285 |
| 6,712,403 B1 | * | 3/2004 | Dusevic | F16L 23/032 |
| | | | | 285/363 |
| 2006/0017233 A1 | * | 1/2006 | Efremov | H02G 15/113 |
| | | | | 277/602 |
| 2007/0102926 A1 | | 5/2007 | Magnier | |
| 2010/0295298 A1 | * | 11/2010 | Haumont | F16J 15/04 |
| | | | | 285/412 |
| 2011/0116588 A1 | * | 5/2011 | Ricot | G21C 13/028 |
| | | | | 376/205 |
| 2014/0028021 A1 | | 1/2014 | Freund | |
| 2016/0312935 A1 | | 10/2016 | Koyanagi | |
| 2020/0318762 A1 | | 10/2020 | Dong et al. | |

FOREIGN PATENT DOCUMENTS

| | | | | |
|---|---|---|---|---|
| DE | 4340051 A1 | | 6/1995 | |
| GB | 1188969 A | * | 4/1970 | F16L 23/20 |
| GB | 2200179 A | | 9/2004 | |

* cited by examiner

COMPACT RAISED FACE FLANGE

PRIORITY

This application claims priority to U.S. Provisional Patent Application No. 62/736,218, filed on Sep. 25, 2018 and entitled: DUAL RAISED FACE SELF-ENERGIZING VESSEL CLOSURE FLANGE, which is herein incorporated by reference in its entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to a compact raised face flange, and some embodiments relate to a dual raised face self-energizing nuclear reactor module vessel closure flange.

BACKGROUND

Figure 1A:
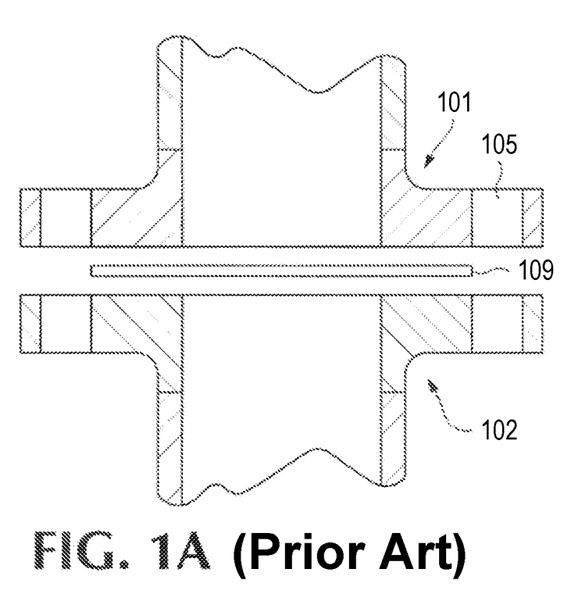
FIG. 1A illustrates a cross-sectional view of piping including a flat face flange.

Piping may include piping flanges to provide a leak-free coupling between two pipe segments. FIG. 1A illustrates a cross section of piping including a pipe segment 101 having a flat face flange formed thereon to mate with a flat face flange formed on a pipe segment 102. The flat face flanges may include bolt openings 105 to receive bolts that may be tightened to form a leak-free joint (in some examples, using a ring gasket 109).

Figure 1B:
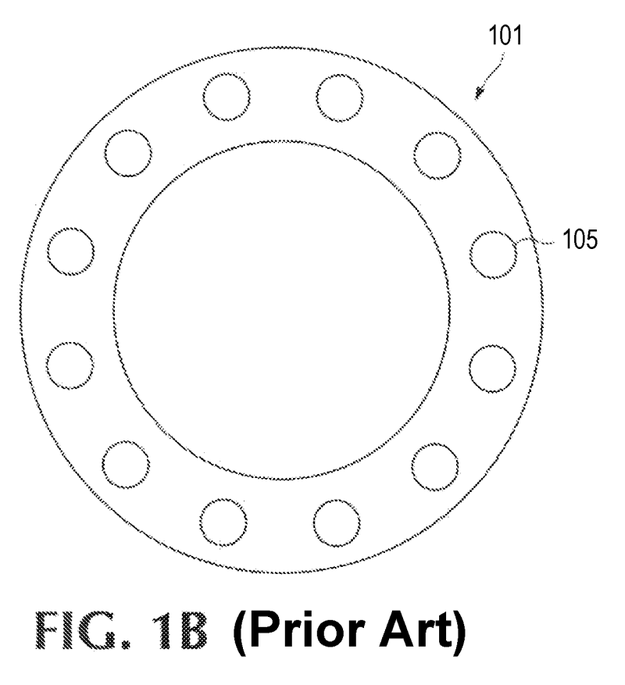
FIG. 1B illustrates an end view of the flat face flange of FIG. 1B.

As illustrated by FIG. 1B, which shows an end view of the flat face flange of the pipe segment 101, the bolt openings may surround the piping. The required bolt tension for each bolt to avoid a leak may be based on a quantity of the bolts and internal pressure in the piping.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Some flanges used for reactor pressure vessels (RPVs) or containment vessels in nuclear reactor modules may resemble a configuration similar to piping flanges, except that the diameters are much larger. Depending on the pressure load of the vessel, the required bolt tension for each bolt to avoid a leak may be too high for commercially available tensioning tools for some known flanges (such as the flat face flange or some known raised face flanges). Even for pressure loads where commercially available tensioning tools can be used, the required flange/bolt dimensions may require large quantities of raw materials (e.g., steel), great expense to manufacture/assembly, and/or may require an undesirably large footprint for the nuclear reactor module.

For some vessels, one way to control leaks may be to select an appropriate number and size of bolts to resist the pressure load of the vessel. However, in some nuclear reactor modules, due to the offset between the centerline of the adjoining vessel shells and the flange, a large amount of rotation (e.g., prying) may occur. This rotation may lead to leaks unless the flange is stabilized.

To minimize flange rotation for avoiding leaky joints, bolt tension may be increased. However, the amount of bolt tension needed in some nuclear reactor modules for known flat face or raised face flange configurations may be too high for commercially available tools. Developing custom bolt tensioning tools and processes may require significant capital investment, testing and prototype.

Some embodiments described herein include a dual raised face self-energizing vessel closure flange for a nuclear reactor module. This flange may include two raised faces to generate a mechanical lever action between the contact faces and bolt axes. The two raised faces may be offset by a small amount to de-energize the vessel shell during both bolt tensioning and to energize the seal surface(s). The de-energized shell may deform during application of pressure to less extent than in other nuclear reactor modules, which may stabilize the joint against rotation and prying. This configuration may allow the bolt loads to be reduced significantly to a range where commercially available bolt tensioning tools may be used.

Figure 2A:
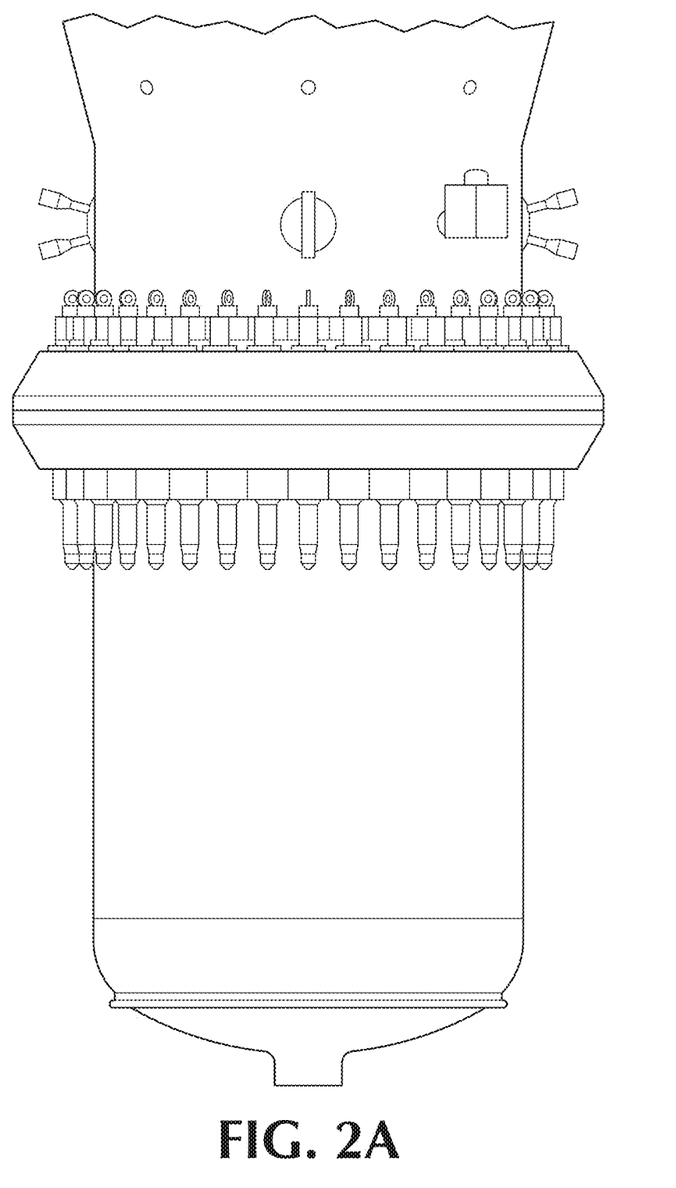
FIG. 2A illustrates a vessel flange joint based on a flat face flange in a nuclear reactor module.
Figure 2B:
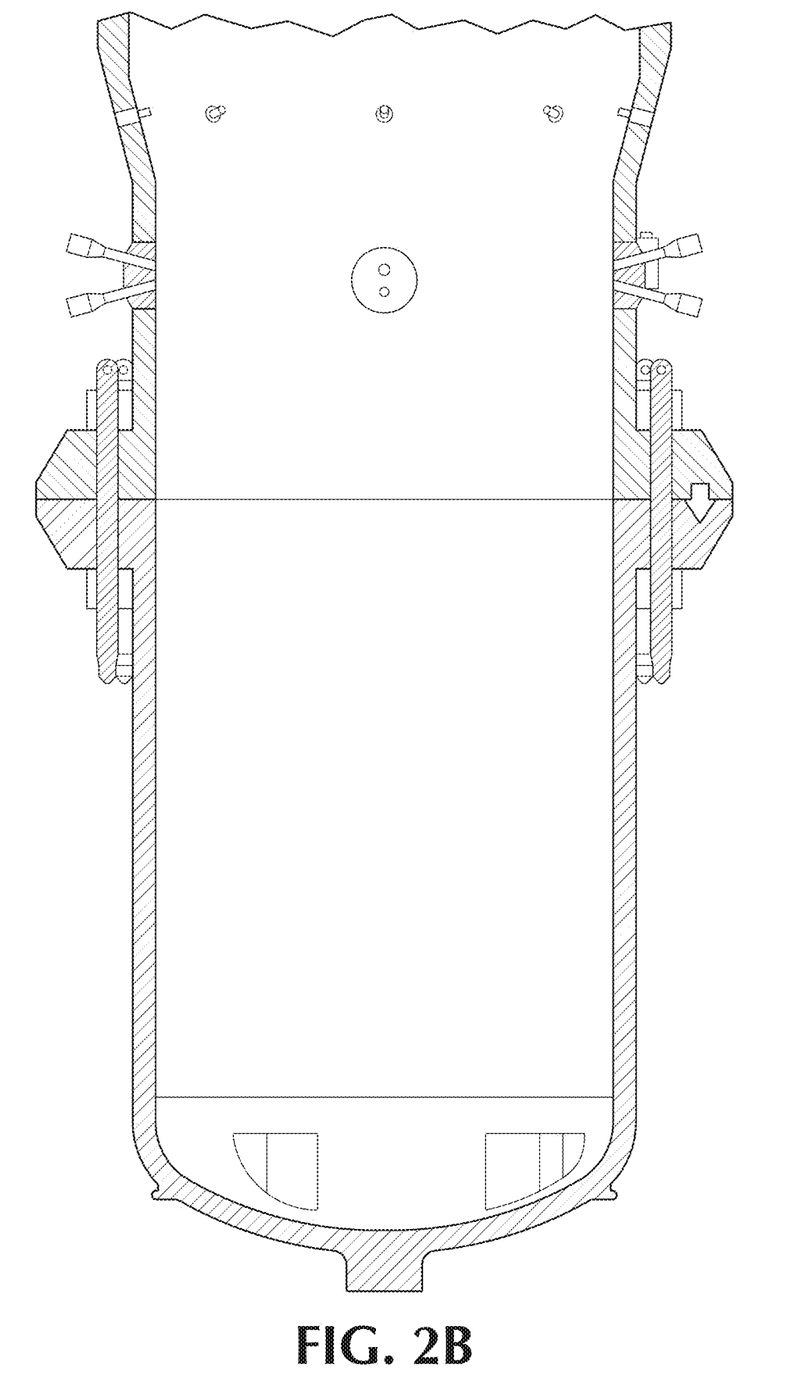
FIG. 2B is a cross-sectional view of the vessel flange joint of FIG. 1A.

The reduced bolt loads may lead to a more compact design—the flange may be smaller than flanges used in known nuclear reactor modules for a given pressure load. For instance, while a dimension of a flat face flange may be required to be the same length as a diameter of a vessel for a given pressure load (to provide a flat face surface of the same length), this dimension may be reduced for the same pressure load by using raised face flanges, and still further reduced by providing the offset for the same pressure load—providing an overall more compact flange for the given pressure load. FIGS. 2A-B illustrate a vessel flange joint that may be used in an RPV and/or containment vessel. The vessel flange joint may utilize any compact raised face flange assembly described herein.

Also, since any application in which a leak tight flange is needed may benefit from a more compact flange (e.g., reduced material costs), any compact raised face flange described herein may be used in any environment in which a leak tight flange is needed, such as marine environments, piping, fluid (e.g., liquids or gasses) storage vessels, etc., even where the scale of dimensions may be completely different than a nuclear reactor vessel.

Figure 3:
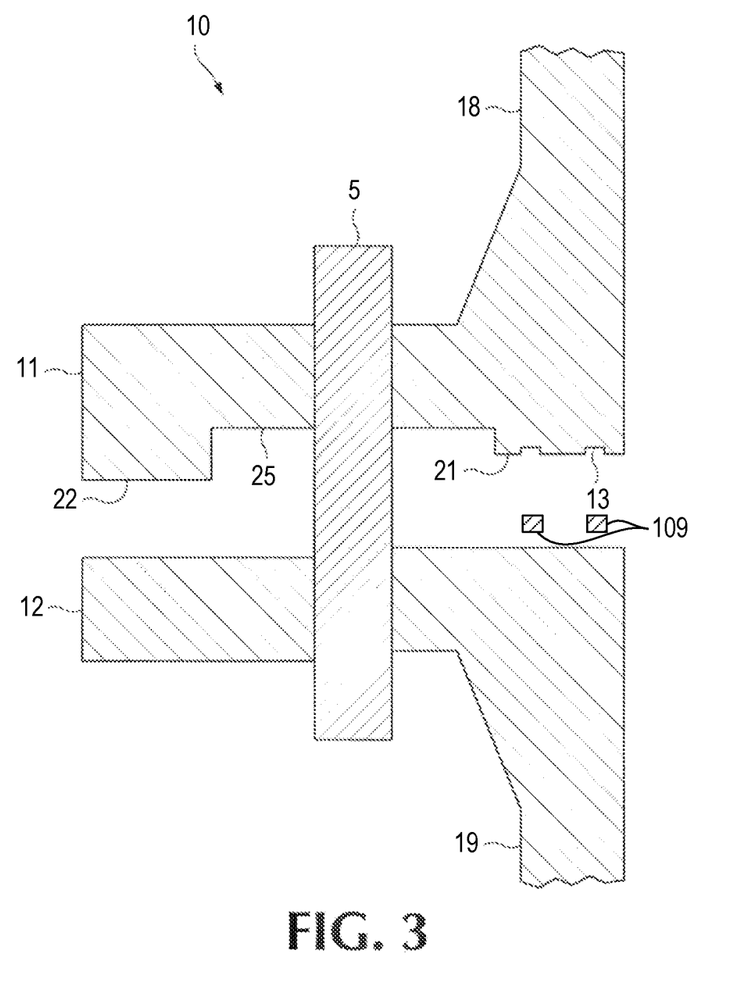
FIG. 3 illustrates a cross-sectional of a compact raised face flange assembly using a dual raised face, according to various embodiments.

FIG. 3 illustrates a cross-sectional view of a compact raised face flange assembly 10 using a dual raised face, according to various embodiments. The assembly 10 may include a raised face flange 11 (e.g., an upper flange or a lower flange) formed on a sidewall 18 of a shell (e.g., an upper sidewall or a lower sidewall) and a mating flange 12 (e.g., the other of the upper flange or the lower flange) formed on the sidewall 19 of the shell (e.g., the other of the upper shell or the lower shell). The assembly 10 may include a bolt 5 (and associated bolt fasteners, not shown) to apply tension to hold the flanges 11 and 12 together to form a seal. For instance, the bolt 5 may compress one or more gaskets 109 (shown schematically) located between the flanges 11 and 12 to form the seal.

The raised face flange 11 may include a bolting circle face 25 defining an opening for the bolt 5 and a pair of offset raised faces. The pair of offset raised faces may include an inner diameter raised face 21 that is offset with respect to an outer diameter raised face 22. In particular, a distance between an area of the outer diameter raised face 22 and a plane of the bolting circle face 25 may be greater than a distance between an area of the inner diameter raised face 21 and the plane of the bolting circle face 25 to maintain the seal.

The pair of raised faces may include any seal feature used in any known flanges. For instance, the inner diameter raised face 21 may include one or more grooves to receive one or more ring gaskets 109, respectively. In some examples, an exposed portion of the inner diameter raised face 21 may make contact with a corresponding surface of the mating flange (e.g., the seal feature may be located within a channel formed in one or both of the surfaces).

In this example, the surfaces of the pair of offset raised faces are entirely in parallel planes (e.g., both surfaces are flat and have no slope), which may reduce machining complexity. In other examples depending on machining options available, the surface of the inner diameter raised face 21 may be sloped with a thinner section closer to the bolt opening. The slope may be a linear slope or a non-linear slope along the entire surface of the inner diameter raised face 21. A sloped surface in which the thinner section is closer to the bolt opening may further distribute pressure along the surface of the inner diameter raised face (e.g., compensate for a "fish mouth" prying caused by more force on an area of the surface closest to the bolt opening). In the case of a linear slope, the entire surface of the inner diameter raised face 21 may be located in a plane that is intersecting with a plane in which the surface of the outer diameter raised face 22 is located. In some examples, the outer diameter raised face 22 may also include a slope, and this slope may correspond to an inner diameter raised face slope (e.g., simultaneous sloping).

For the purpose of emphasis, the offset in the illustration is not to scale. In some nuclear reactor module applications, the offset may be approximately 30 mils (e.g., the outer diameter raised face 22 may be approximately 30 mils thicker, say 20-40 mils thicker, than the inner diameter raised face). In other applications in which the compact raised face flange assembly 10 is smaller or larger, the offset may also be smaller or larger. A thickness of the offset may be selected based on a deformability of vessel sidewalls (e.g., a pipe sidewall), a flexibility of the body of the raised face flange, required bolt tension, distance between the pair of offset raised faces, or any other characteristic of the pressure device (e.g., a vessel, a pipe, a hull, a hatch, or the like, or combinations thereof) and/or the raised face flange assembly 10.

In the illustrated example, the mating flange 12 includes a flat face. In other examples, it may be possible and practical to use a difference surface on the mating flange 12. For instance, it may be possible and practical to include raised faces on the mating flange 12 (and raised faces on the mating flange 12 may or may not include any offset depending on how much offset is included for the pair of raised faces of the raised face flange 11).

The raised face flange assembly 10 may be used with any pressure device (e.g., vessel) described herein. For example, in an example in which the raised face flange assembly 10 is used for a vessel similar to the vessel shown in FIGS. 2A-B, the faces 21, 22, and 25 and the one or more grooves 13 may form a continuous ring shape. The bolting circle face 25 may include any number of bolt openings for any number of bolts 5 to surround the vessel. As described herein, bolt tension for each bolt may be less than the bolt tension used in some known vessel flange joints. As a result, bolts may be smaller, and dimensions of the flange may also be smaller. Accordingly, the flange may protrude less from the vessel than a vessel flange joint based on known flanges—reducing the overall footprint of a nuclear reactor module.

Any feature of the raised face flange 11 or any other flange described herein may be used in a blind flange, vessel nozzle covers, bolted valves, bonnets of a valve, or the like. In some examples, a blind flange, vessel nozzle covers, bolted valves, bonnets of a valve, or the like, may include a dual raised face similar to the dual raised face of raised face flange 11.

Figure 4:
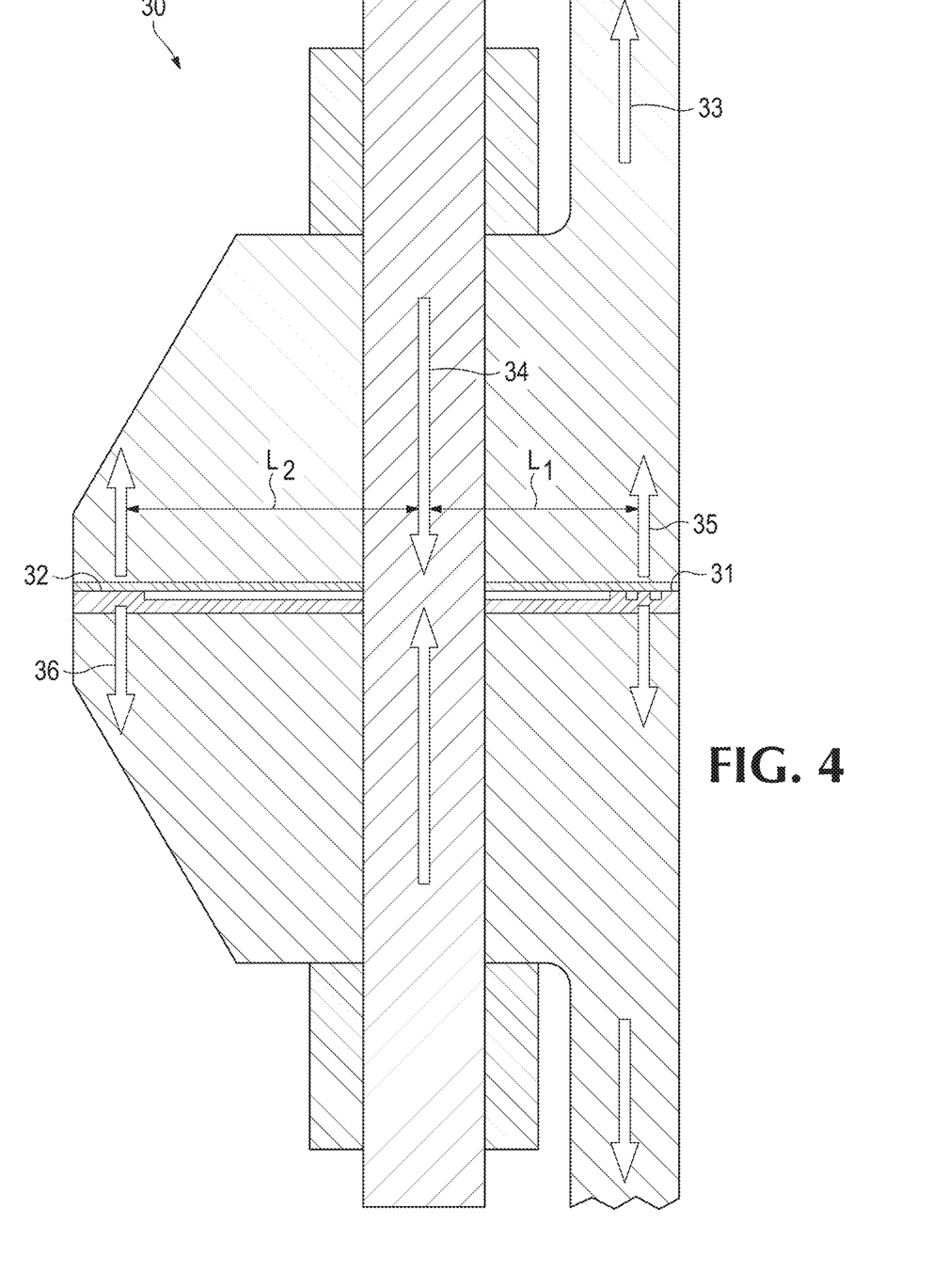
FIG. 4 illustrates internal forces acting on a compact raised face flange assembly under internal pressure in the vessel, according to various embodiments.

FIG. 4 illustrates internal forces acting on a compact raised face flange assembly 30 under internal pressure in the vessel, according to various embodiments. The compact raised face flange assembly 30 may be similar to any compact raised face flange assembly described herein, such as compact raised face flange assembly 10 (FIG. 3). The internal forces may include a contact force 35 associated with the inner diameter raised face 31, a contact force 36 associated with the outer diameter raised face 32, an endcap pressure force 33 in the vessel shell, and bolt tension 34.

Prying may be primarily caused by the endcap pressure force 33 because this force 33 may be offset from a center of the bolt. This lever action and rotation of the flange may be exacerbated by the flexibility of the flange itself (given that the flange has a finite thickness/rigidity). The rotation of the flange may be controlled by the geometric distances of the lever arms ($L_1$ and $L_2$ in addition to the flange thickness) and the magnitude of the forces in the flange system.

While equilibrium of the system may be maintained by the internal forces, that alone does not ensure a leak-tight joint. In order to prevent leakage through the flange, the contact at the seal surfaces may be maintained below the springback of the seal. By increasing bolt tension, the contact force at the inner diameter of the flange may be maintained at the seals. However, this may require a large magnitude of bolt load.

Figure 5A:
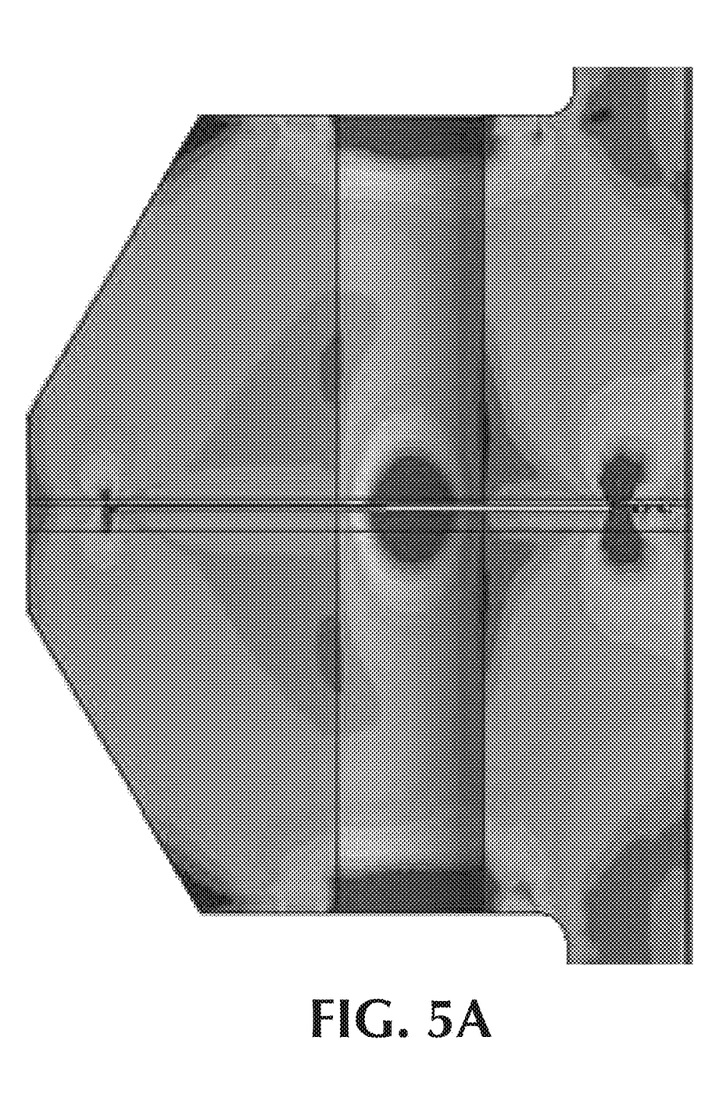
FIG. 5A is a heat map indicative of internal force distribution in a raised face flange with no offset between raised faces.
Figure 5B:
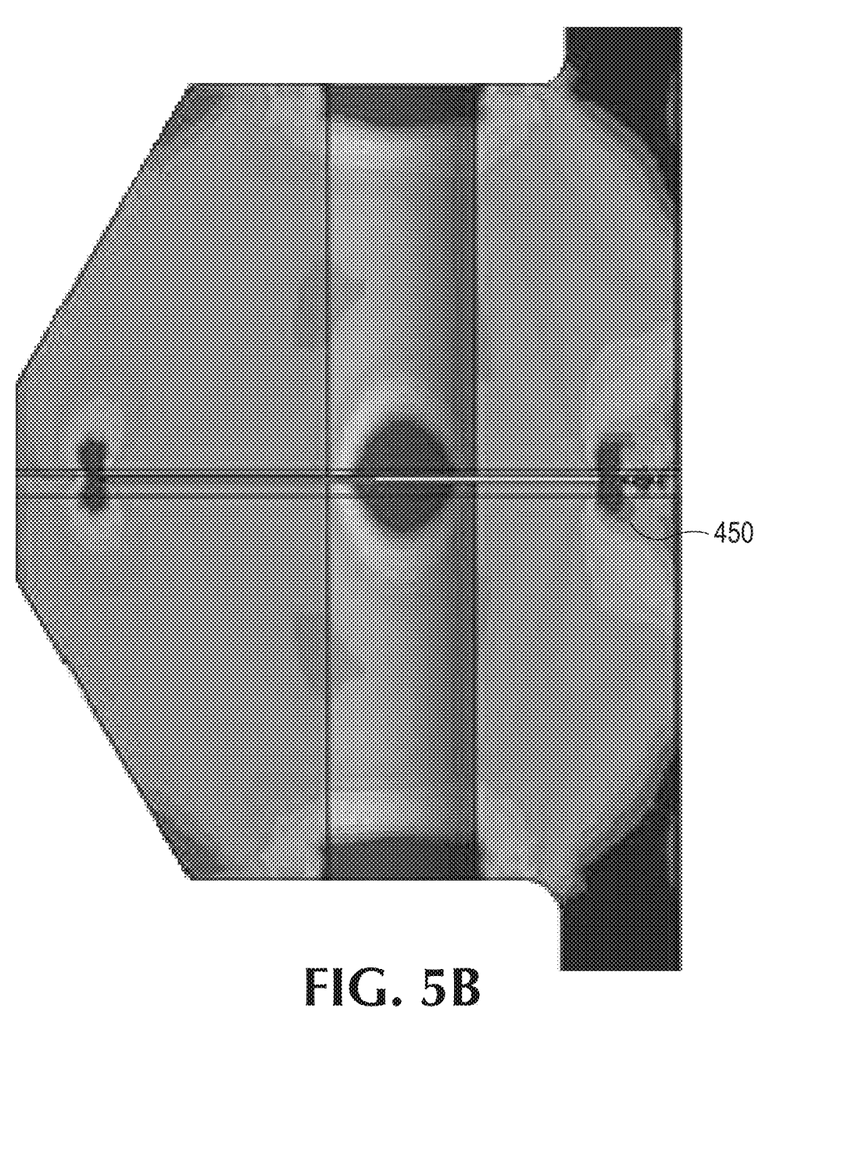
FIG. 5B is a heat map indicative of internal force distribution in a raised face flange with the small offset.

In order to stabilize the joint rotation, a small offset between the two raised faces of the flange may be introduced such that the thickness of the outer diameter may be slightly larger than the thickness of the inner diameter. FIG. 5A is a heat map indicative of internal force distribution in a raised face flange with no offset between raised faces, and FIG. 5B is a heat map indicative of internal force distribution in a raised face flange with the small offset. FIGS. 5A and 5B show the relative stress distribution of the flange when the same bolt load is applied with (FIG. 5B) and without (FIG. 5A) the small offset.

The effect of the small offset of the pair of raised faces manifests itself in two observations. First, the contact stress distribution 450 at the seal grooves shows a more uniformed and concentrated distribution with the small offset included. The better contact force may ensure a leak tight seal arrangement. Second, when the small offset is included, vessel shell stresses 451 may be reduced in the vicinity of the transition region from the flange to the vessel shell. As a result, more of the bolt tension strain energy may be utilized to keep the joint tight as the vessel shell is de-energized (e.g., not deforming). This feature may be referred to as the self-energizing characteristics of the small offset on the seal joint. The bolt load necessary to keep the joint leak tight may be reduced by over 30-40%, which in some nuclear reactor modules may allow the use of commercially available equipment.

Figure 6:
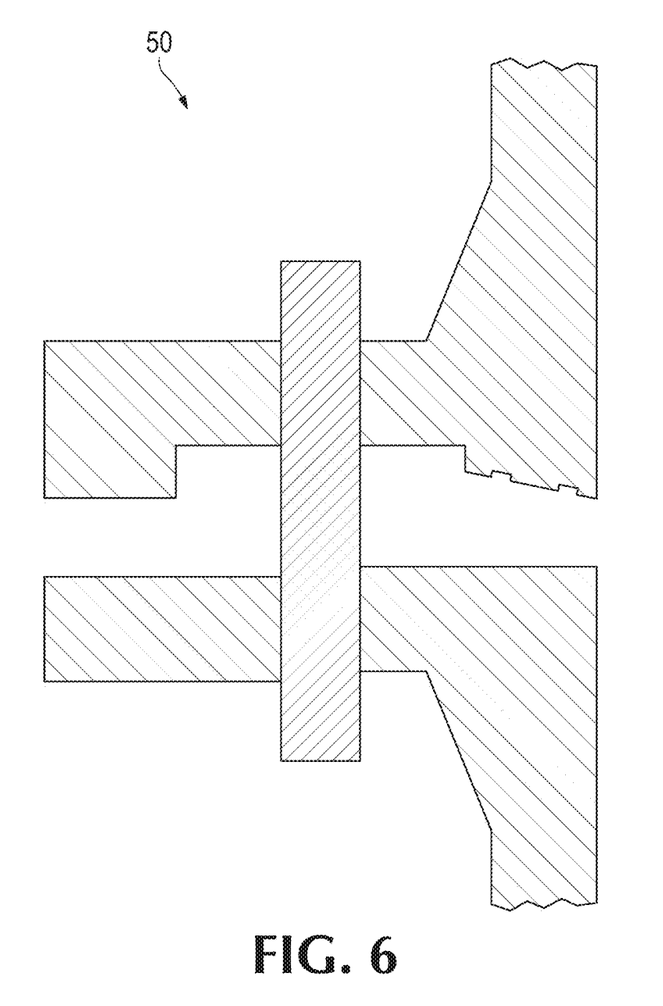
FIG. 6 illustrates a cross-sectional of a compact raised face flange assembly with a linearly sloped inner raised face, according to various embodiments.

Any compact raised face flange described herein may be formed by forging, e.g., forging a vessel shell having a compact raised face flange formed thereon. In other examples, it may be possible and practical to mill one raised face following forging to, say, form a linear slope or a non-linear slope. FIG. 6 illustrates a cross-sectional of a compact raised face flange assembly 50 with a linearly sloped inner raised face, according to various embodiments. A non-linear slope may have a curved profile that may be based on an expected bowing of the flange (e.g., the curve profile may match a curve profile of an expected deformation of the bolting circle face for a given bolt tension/vessel shell rigidity). As mentioned previously, in some examples it may be beneficial to provide a slope on the outer raised face as well, e.g., a slope corresponding to a slope of an inner raised face.

In the illustrated examples, a vessel of a nuclear reactor vessel may resemble two pipes. However, any compact raised face flange described herein may be used in other scenarios. For instance, some nuclear reactor vessels may include a cylindrical vessel and a hemi-spherical head to provide a more direct and advantageous load path for the internal pressure to react on, and any compact raised face flange described herein, of course, may be utilized with these nuclear reactor vessels. Also, in some applications, a pressure device on which any compact raised face flange described herein may be utilized may be any other shape (not necessarily including any sidewall resembling a pipe).

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope.

EXAMPLES

Example 1 is a raised face flange, comprising: a bolting face defining one or more openings for one or more bolts, respectively; a pair of raised faces including a first raised face disposed in a first plane and a second raised face to form a seal in a nuclear reactor module, the second raised face disposed in a second plane that is different than the first plane; wherein the bolting face is disposed in a third plane that is different than the first and second planes; and wherein a distance between an area of the second raised face and the third plane is greater than a distance between the first plane and the third plane to distribute contact force with a mating flange over the area of the second raised face to maintain the seal.

Example 2 may include the subject matter of example 1 and/or any other example herein, wherein the first and second planes are non-intersecting.

Example 3 may include the subject matter of any of example 1 and/or any other example herein, wherein the first and second planes are intersecting.

Example 4 may include the subject matter of any of examples 1-3 and/or any other example herein, wherein the second raised face includes one or more features to mount a gasket thereon or therein.

Example 5 may include the subject matter of any of examples 1-4 and/or any other example herein, wherein the gasket comprises one or more ring gaskets, and wherein the one or more features comprise one or more grooves to receive the one or more ring gaskets, respectively.

Example 6 may include the subject matter of any of examples 1-5 and/or any other example herein, wherein a surface of the second raised face comprises a linear slope, the linear sloped surface having a first section that is farther from the third plane than a second different section of the linear sloped surface, and wherein the second section of is farther from a nearest one of the one or more bolt openings than the first section.

Example 7 may include the subject matter of any of examples 1-6 and/or any other example herein, wherein the seal comprises a seal of a reactor vessel of the nuclear reactor module.

Example 8 may include the subject matter of any of examples 1-6 and/or any other example herein, wherein the seal comprises a seal of a containment vessel of the nuclear reactor module.

Example 9 may include the subject matter of any of examples 1-8 and/or any other example herein, wherein each of the first and second raised surface are continuous along a ring shape.

Example 10 may include the subject matter of any of examples 1-9 and/or any other example herein, wherein a difference between the distances is selected based on a deformability of a sidewall of a pressure device on which the raised face flange is mounted.

Example 11 is a vessel of a nuclear reactor module, the vessel comprising: a vessel flange joint to couple a first cylindrical sidewall of the vessel to a second sidewall of the vessel; the vessel flange joint including an upper flange coupled to lower flange using one or more bolts, wherein the upper flange or the lower flange includes: a bolting face defining one or more openings for the one or more bolts, respectively; a pair of raised faces including a first raised face and a second raised face to make contact with a mating surface of the other of the upper flange or the lower flange; and wherein a distance between an area of the second raised face and a plane corresponding to the bolting face is greater than a distance between an area of the first raised face and the third plane to distribute contact force with a mating flange over the area of the second raised face to optimize a seal of the vessel flange joint Example 12 may include the subject matter of any of example 11 and/or any other example herein, wherein the second sidewall comprises a second cylindrical sidewall.

Example 13 may include the subject matter of any of examples 11-12 and/or any other example herein, wherein the vessel contains a reactor coolant.

Example 14 may include the subject matter of any of examples 11-13 and/or any other example herein, wherein the vessel contains a reactor pressure vessel or a containment vessel for a reactor pressure vessel.

Example 15 may include the subject matter of any of examples 11-14 and/or any other example herein, wherein the vessel flange joint comprises a first vessel flange joint, and wherein the reactor pressure vessel comprises a second vessel flange joint.

Example 16 is a raised face flange assembly, comprising: an upper flange to couple to a lower flange using one or more bolts: wherein the upper flange or the lower flange comprises: a bolting face defining one or more openings for the one or more bolts, respectively; a pair of raised faces including a first raised face and a second raised face to make contact with a mating surface of the other of the upper flange or the lower flange; and wherein a distance between an area of the second raised face and a plane corresponding to the bolting face is greater than a distance between an area of the first raised face and the plane to distribute contact force with a mating surface over the area of the second raised face to maintain a seal.

Example 17 may include the subject matter of any of example 16 and/or any other example herein, wherein the seal is formed by one or more gaskets located in one or more grooves formed on the second raised face.

Example 18 may include the subject matter of any of examples 16-17 and/or any other example herein, wherein the upper flange is formed on an edge of a first cylindrical sidewall of a vessel having a cylindrical body, and the lower flange is formed on an edge of a second different cylindrical sidewall of the vessel.

Example 19 may include the subject matter of any of examples 16-18 and/or any other example herein, wherein the vessel comprises a containment vessel or a nuclear reactor vessel.

Example 20 may include the subject matter of any of examples 16-19 and/or any other example herein, wherein a difference between the distances is in the range of 20-40 mils.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A raised face flange system comprising:
a first, raised face flange having:
 a bolting face defining one or more openings for one or more bolts, respectively; and
 a pair of raised faces including a first raised face disposed in a first plane and a second raised face to form a seal in a nuclear reactor module, the second raised face disposed in a second plane that is different than the first plane;
a second, flat-faced flange; and
a bolt extending through the first flange and the second flange in series,
wherein the bolting face is disposed between the raised faces in a third plane that is different than the first and second planes;
wherein the bolting face and the raised faces face in one direction; and
wherein a distance between an area of the second raised face and the third plane is greater than a distance between an area of the first raised face and the third plane to distribute contact force with the second flange over the area of the second raised face to maintain the seal.

2. The raised face flange system of claim 1, wherein the first and second planes are non-intersecting.

3. The raised face flange system of claim 1, wherein the first and second planes are intersecting.

4. The raised face flange system of claim 1, wherein the first raised face includes one or more features to mount a gasket thereon or therein.

5. The raised face flange system of claim 4, further comprising the gasket, and wherein the gasket comprises one or more ring gaskets, and wherein the one or more features comprise one or more grooves to receive the one or more ring gaskets, respectively.

6. The raised face flange system of claim 1, wherein a surface of the first raised face has a linear slope, the linear sloped surface having a first section and a second section, the first section being farther from the third plane than is the second section, and wherein the first section is farther from a nearest one of the one or more bolt openings than is the second section.

7. The raised face flange system of claim 1, wherein the seal comprises a seal of a reactor vessel of the nuclear reactor module.

8. The raised face flange system of claim 1, wherein the seal comprises a seal of a containment vessel of the nuclear reactor module.

9. The raised face flange system of claim 1, wherein each of the first and second raised faces form at least one corresponding continuous ring shape.

10. The raised face flange system of claim 1, wherein a difference between the distances is selected based on a deformability of a sidewall of a pressure device on which the raised face flange is mounted.

11. A vessel of a nuclear reactor module, the vessel comprising:
a vessel flange joint to couple a first cylindrical sidewall of the vessel to a second sidewall of the vessel;
the vessel flange joint including an upper flange coupled to a lower flange using at least one bolt extending through the upper flange and the lower flange in series, wherein at least one of the upper flange or the lower flange is a flat-faced flange, and wherein the other of the upper flange or the lower flange includes:
 a bolting face having one or more openings for the at least one bolt, respectively;
 a pair of raised faces positioned on opposite sides of the bolting face, and including a first raised face in a first plane and a second raised face in a second plane, the raised faces positioned to make contact with a mating surface of the other of the upper flange or the lower flange, the raised faces and the bolting face facing in one direction; and
 wherein a distance between an area of the second raised face and a third plane corresponding to the bolting face is greater than a distance between an area of the first raised face and the third plane to distribute a contact force with the mating surface.

12. The vessel of claim 11, wherein the second sidewall comprises a second cylindrical sidewall.

13. The vessel of claim 11, wherein the vessel contains a reactor coolant.

14. The vessel of claim 11, wherein the vessel contains a reactor pressure vessel or a containment vessel for a reactor pressure vessel.

15. The vessel of claim 14, wherein the vessel flange joint comprises a first vessel flange joint, and wherein the reactor pressure vessel comprises a second vessel flange joint.

16. A raised face flange assembly, comprising:
an upper flange;
a lower flange; and
at least one bolt coupling the upper flange and the lower flange:
wherein at least one of the upper flange or the lower flange is a flat-faced flange, and the other of the upper flange or the lower flange comprises:
a bolting face having at least one opening for the at least one bolt;
a pair of raised faces positioned on opposite sides of the bolting face, and including a first raised face in a first plane and a second raised face in a second plane, the raised faces positioned to make contact with a mating surface of the other of the upper flange or the lower flange;
wherein the bolting face and the raised faces face in one direction; and
wherein a distance between an area of the second raised face and a third plane corresponding to the bolting face is greater than a distance between an area of the first raised face and the third plane to distribute a contact force with the mating surface.

17. The raised face flange assembly of claim 16, further comprising one or more gaskets located in one or more grooves formed in the first raised face.

18. The raised face flange assembly of claim 16, wherein the upper flange is formed on an edge of a first cylindrical sidewall of a vessel having a cylindrical body, and the lower flange is formed on an edge of a second, different cylindrical sidewall of the vessel.

19. The raised face flange assembly of claim 18, wherein the vessel comprises a containment vessel or a nuclear reactor vessel.

20. The raised face flange assembly of claim 16, wherein a difference between the distances is in the range of 20-40 mils.

* * * * *

UNITED STATES PATENT AND TRADEMARK OFFICE
CERTIFICATE OF CORRECTION

| | |
|---|---|
| PATENT NO. | : 11,300,236 B2 |
| APPLICATION NO. | : 16/221088 |
| DATED | : April 12, 2022 |
| INVENTOR(S) | : Tamas Liszkai |

It is certified that error appears in the above-identified patent and that said Letters Patent is hereby corrected as shown below:

In the Claims

In Column 7, Line 48, in Claim 1, delete "system" and insert -- system, --.

Signed and Sealed this
Twenty-fifth Day of October, 2022

*Katherine Kelly Vidal*

Katherine Kelly Vidal
*Director of the United States Patent and Trademark Office*